United States Patent [19]

Norberg et al.

[11] Patent Number: 4,566,951
[45] Date of Patent: Jan. 28, 1986

[54] METHOD FOR CLEANING CATHODE OR ANODE PLATES

[75] Inventors: Gustav S. I. Norberg; Kjell E. L. Segerström, both of Karlstad; Tommy E. Ahl, Kil, all of Sweden

[73] Assignee: Wenmec AB, Kil, Sweden

[21] Appl. No.: 586,276

[22] Filed: Mar. 5, 1984

[30] Foreign Application Priority Data

Mar. 5, 1983 [DE] Fed. Rep. of Germany ....... 3307890

[51] Int. Cl.$^4$ .......................... C25D 1/04; B08B 3/02
[52] U.S. Cl. ........................................ 204/12; 134/15; 134/25.4; 134/32; 134/64 R; 134/122 R; 134/199; 204/203
[58] Field of Search ................ 134/15, 25.4, 32, 64 R, 134/122 R, 199; 15/77; 204/12, 194, 232, 203

[56] References Cited

U.S. PATENT DOCUMENTS 2,220,982  11/1940  Toney ..................................... 15/77
3,501,385  3/1970  Jasberg ................................. 204/12
3,501,795  3/1970  Jasberg ................................. 15/77
3,636,677  1/1972  McNamara et al. ............. 204/12 X
3,950,232  4/1976  Nightingale et al. ................. 204/12
4,417,953  11/1983  Viellefont et al. .................... 204/12

*Primary Examiner*—Marc L. Caroff
*Attorney, Agent, or Firm*—Antonelli, Terry & Wands

[57] ABSTRACT

A method for cleaning cathode and/or anode plates which are obtained in the electrolytic refining of metals and which are lifted in groups suspended on bars or lugs from the electrolytic bath and thereafter the plates are washed by passing in succession through the washing operation individually or in pairs inclined in substantially V-manner with respect to each other. Additionally, three or more plates, inclined away from each other substantially in fan manner, may pass through the washing operation. The flat sides of the plates are sprayed at least partially by nozzles which execute a relative movement along the flat sides.

12 Claims, 14 Drawing Figures

FIG. 5
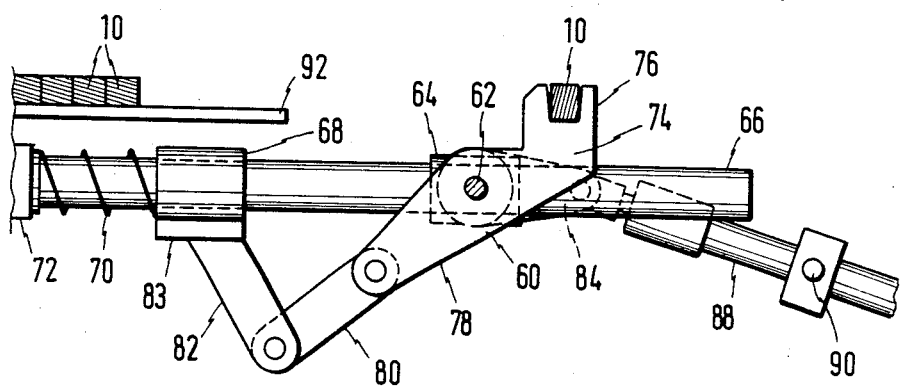
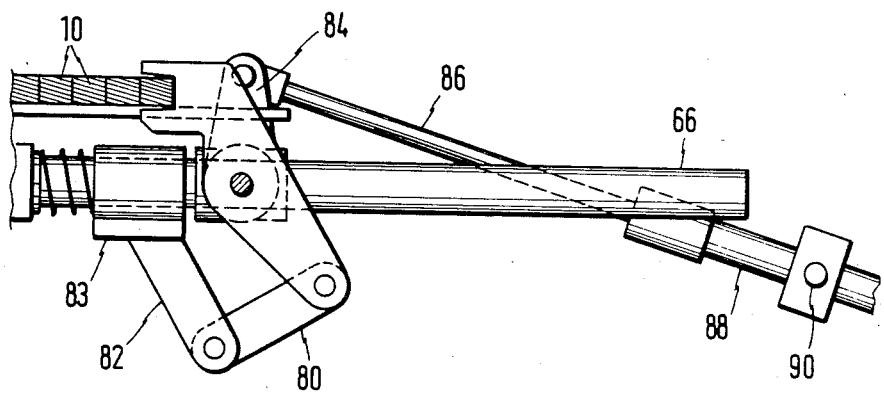
FIG. 6

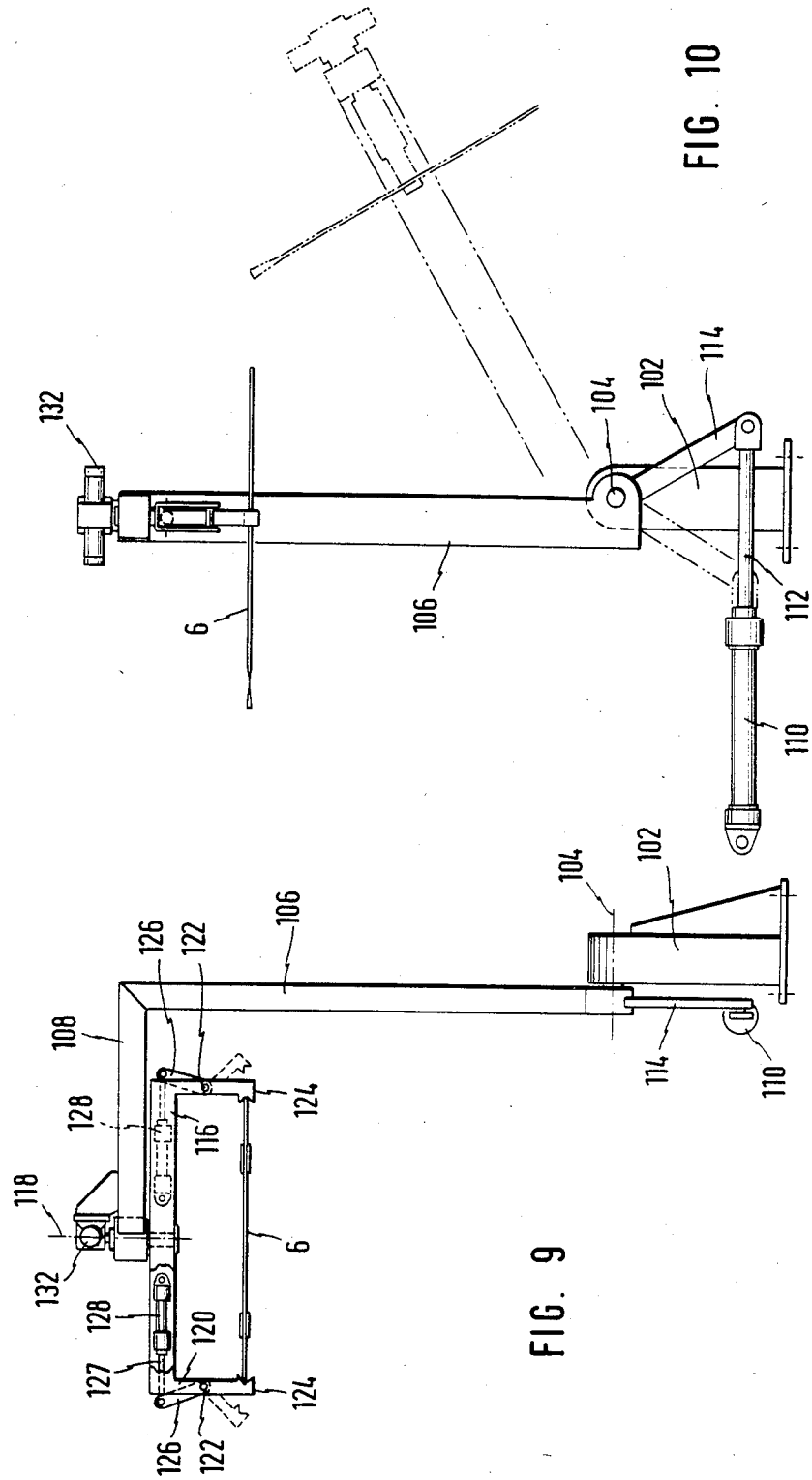

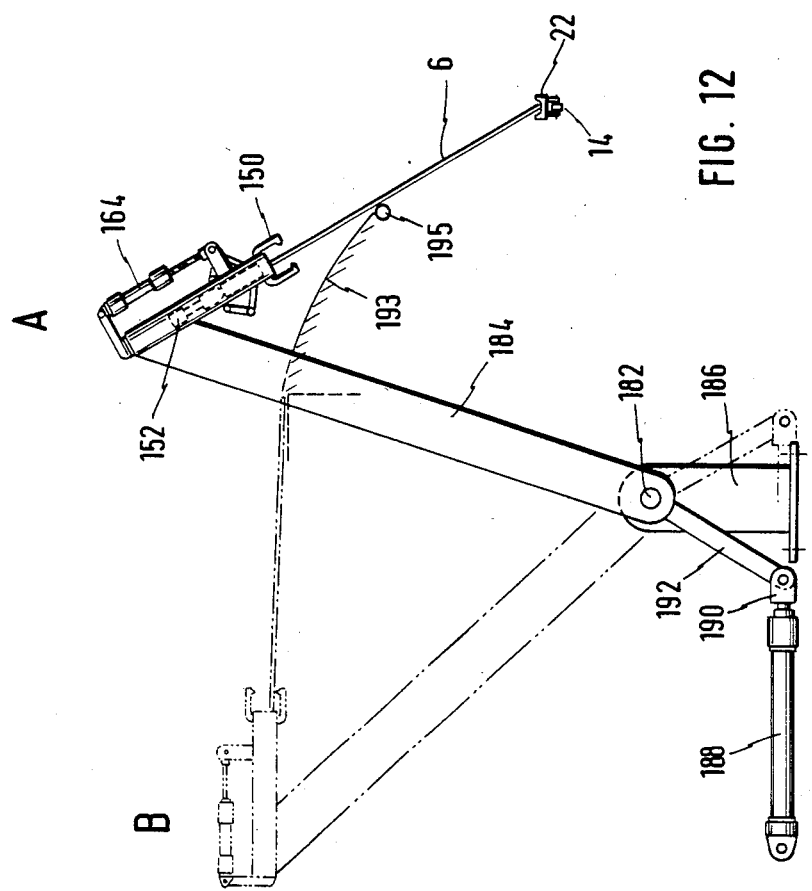
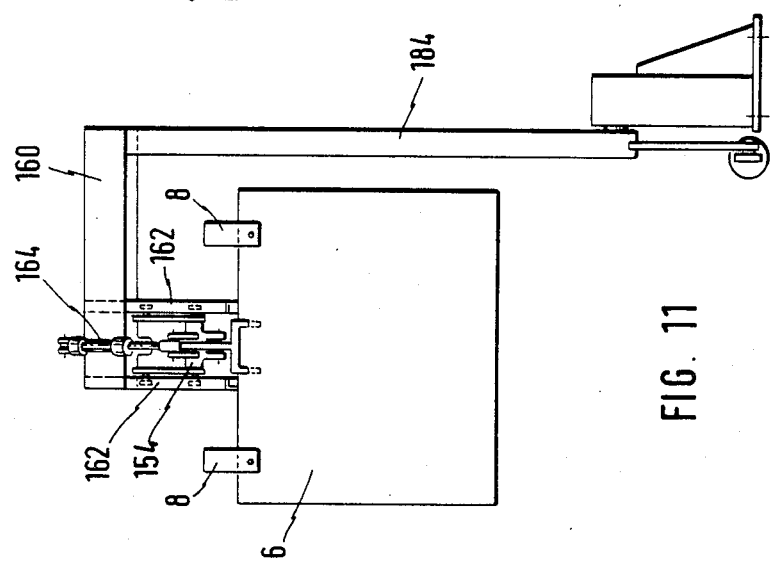

METHOD FOR CLEANING CATHODE OR ANODE PLATES

The present invention relates to a method and apparatus for cleaning cathode and/or anode plates in particular Cu cathode plates, which are obtained in the electrolytic refining of metals and which are lifted in groups suspended on bars or lugs from the electrolytic bath and washed by means of water jets.

The electrolytic refining of copper takes place in electrolytic baths or solutions, pure copper being deposited as cathode plates on starting sheets which consist of thin sheets of pure copper. These starting sheets are provided with loops by which they are suspended on bars in groups at predetermined distances from each other in electrolytic baths. A method and apparatus for making starting sheets for electrolytic refining is described for example in DE-PS Nos. 2,618,679 and 2,644,631. The pure copper is deposited on the starting sheets hanging in the electrolytic bath, the originally very thin, preferably 0.8 mm thick, starting sheets being formed to rigid cathode plates having a weight of 100 kg or more. These cathode plates are usually suspended in electrolytic baths in groups of eight, sixteen, thirty-two and sixty-four and after the deposition of the pure copper are also lifted out of the baths in corresponding groups of eight, sixteen, thirty-two or sixty-four.

The cathode plates must be washed after removal from the electrolytic bath to free them from residues of the electrolytic solution. For this purpose, the cathode plates are usually suspended on the support bars and moved through a washing apparatus perpendicularly to their flat sides in succession, the intervals between the cathode plates corresponding to the distances between the cathode plates in the electrolytic bath. Since these intervals are generally relatively small, for example about ten to twelve cm, it is only possible to spray the flat sides of the cathode plates during their passage through the washing apparatus from the side faces or from the top and bottom by means of water jets. It has now been found that the result of the washing of the cathode plates is generally not satisfactory and that contaminations, in particular residues of the electrolytic solution, remain on the cathode plates. After the washing the support bars are removed from the cathode plates so they can be used again. The cathode plates freed from the bars are then stacked to form packs.

The problem underlying the invention is to provide an improved method and an improved apparatus for cleaning cathode and/or anode plates obtained in electrolytic refining, in which a particularly high degree of cleaning of the plates is achieved.

This problem is solved according to the method of the invention in that the cathode and/or anode plates pass in succession through the washing operation individually or in pairs inclined in substantially V-manner with respect to each other or in threes or more inclined away from each other substantially in fan manner and that the flat sides of the plates are sprayed at least partially by means of nozzles which execute a relative movement along the flat sides.

The method according to the invention has the advantage that it is possible to spray the cathode and/or anode plates from every side, including the flat sides, in unimpaired manner by means of the washing jets because they are no longer moved through the washing apparatus suspended on the bars or lugs in groups in succession at a small distance apart perpendicularly to their flat sides.

According to the invention, it is advantageous for the bars to be removed prior to the washing of the cathode plates and to wash the latter afterwards. This has the advantage that the cleaning of the cathode plates is substantially improved because the bars are removed before the washing and it is thus avoided that during the washing operation contaminations remain in the inaccessible area between bars and loops because the washing jets cannot reach this area.

Preferably, the cathode and/or anode plates are supported at a few points of their surface as far as possible in punctiform or linear manner, in particular at the lower edge or after turning through 180° upside down at their top side, and preferably washed in a substantially vertical position, the cathode and/or anode plates advantageously passing in succession through a preferably multistage washing operation. It may be advantageous for the cathode and/or anode plates to be moved during the washing operation parallel to their flat sides to subject them in succession to the individual stages of the washing operation.

According to the invention, the removal of the bars can be effected by ejection and/or withdrawal thereof from the loops of the cathode plates.

In a modified embodiment of the method according to the invention, to remove the bars the loops are cut and preferably bent up. This procedure has the advantage that the bars can be more easily removed and the insides of the cut and preferably bent-up loops can be more easily cleaned.

In a further modified embodiment of the method according to the invention the loops are severed from the cathode plates. This procedure has the advantage that the loops can be washed separately from the cathode plates and bars. It may however also be advantageous to add the severed loops after separation from the bars to the crude copper.

According to the invention, it is advantageous to wash the bars after the removal from the cathode plates. Thereafter the bars can be stacked in a magazine. According to the invention, when using bars having a cross-sectional profile increasing the carrying capacity and having greater dimensions vertically than horizontally, the bars can be deposited in the magazine with predetermined orientation of their cross-sectional profile.

The apparatus according to the invention for carrying out the method includes a conveying means for receiving and supplying cathode and/or anode plates suspended on bars or lugs to a washing means through which the plates are passed and sprayed with water, and is characterized in that the conveying means includes a first chain conveyor which receives the plates suspended on the bars or lugs in groups and the conveying direction of which extends perpendicularly to the flat sides of the plates and at the end of which a transfer means is disposed which places the plates individually on a second chain conveyor whose conveying direction extends parallel to the flat sides of the plates, and that the second chain conveyor conveys the plates substantially vertically or inclined upright consecutively through the washing means, and that the washing means is followed by a stacking means for stacking in bundles the cleaned plates.

In a modified apparatus according to the invention the plates can be led through the washing means in pairs on the second conveyor upright inclined in V-manner to each other, brought against each other after the washing means and then jointly deposited.

The invention will be explained hereinafter with the aid of schematic drawings of the examples of the embodiment. In the drawings:

FIGS. 5 and 6 show the stacking and turning means for the bars in two different positions;

FIGS. 9 and 10 show a first example of embodiment of the removal and stacking means for the washed cathode plates in front and side view;

FIGS. 11 and 12 show a second example of embodiment of the removal and stacking means for the washed cathode plates in front and side view;

Figure 1:
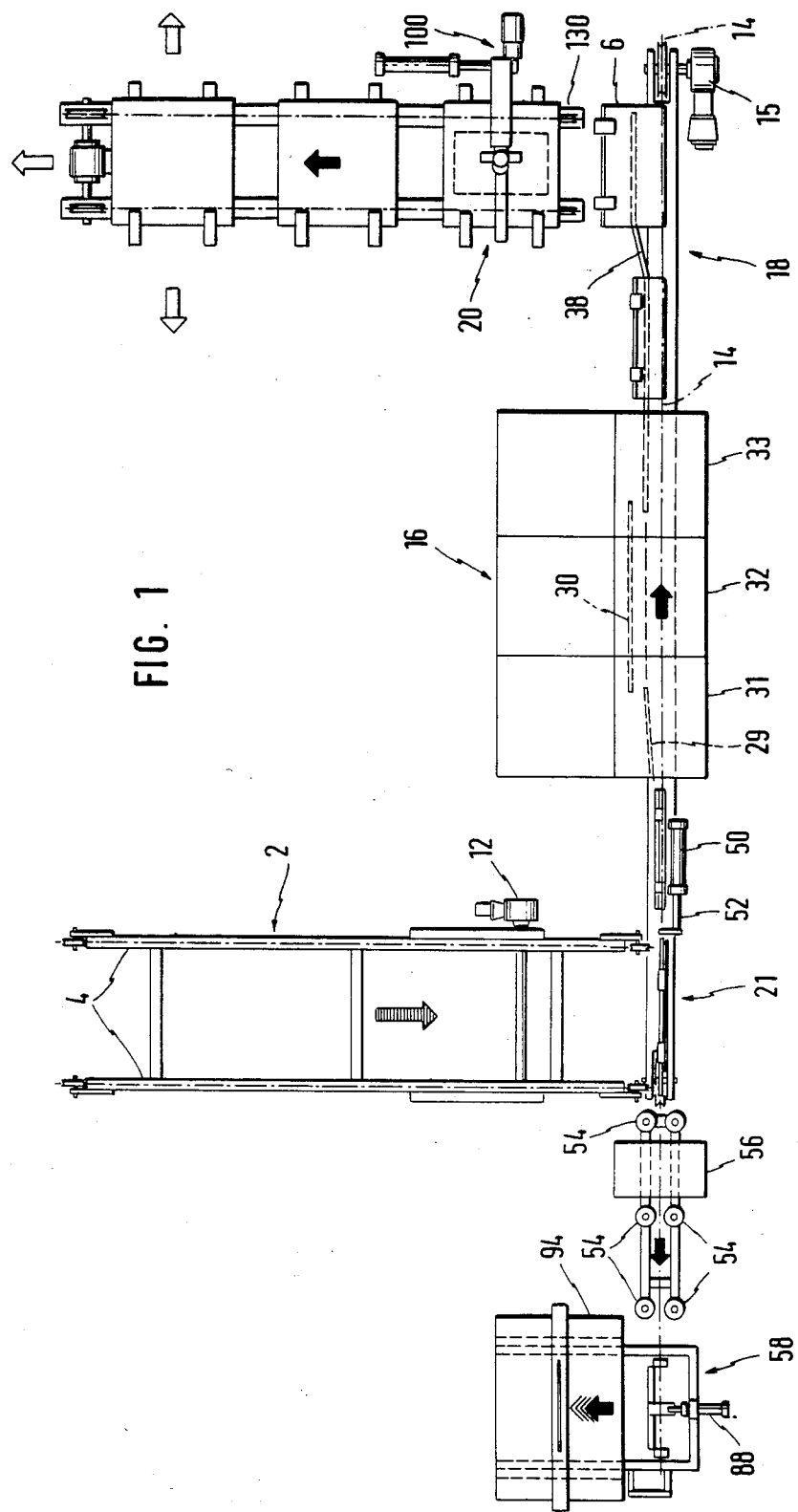
FIG. 1 is a schematic plan view of an apparatus in which cathode plates are washed according to the method of the invention.
Figure 2:
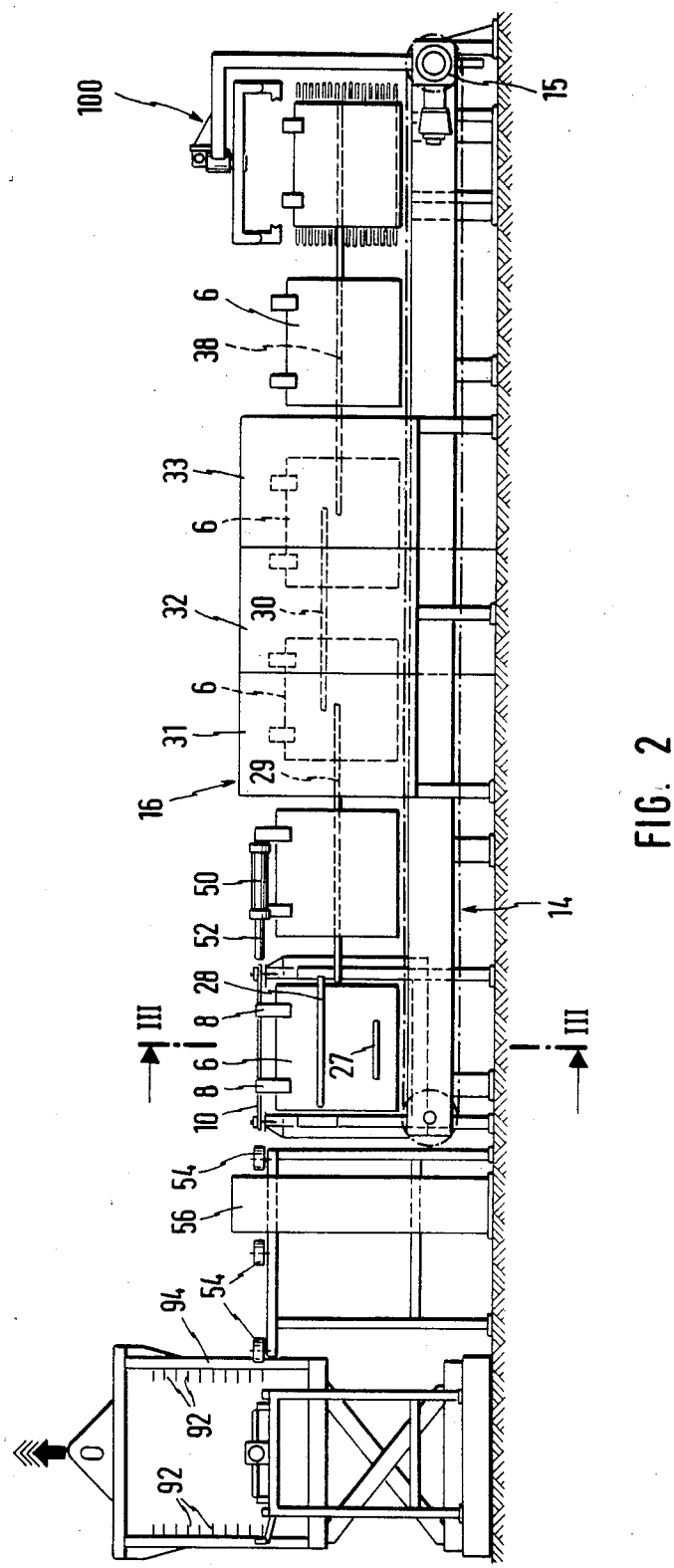
FIG. 2 is an elevation of the apparatus of FIG. 1.

The apparatus illustrated as example of embodiment in FIGS. 1 and 2 and provided for carrying out the method according to the invention comprises a feed means generally designated by the reference numeral 2 which includes a first chain conveyor 4 having two chain strands. Placed on the latter are the cathode plates 6 removed in groups by a crane or the like from the electrolytic baths and suspended in units of for example eight, sixteen, thirty-two or sixty-four by loops 8 on support bars 10, with the plates 6 then being further conveyed perpendicularly to their flat sides. The chain conveyor 4 is driven intermittently by a motor 12. At its end there is a second chain conveyor 14 which is also driven intermittently and to which the cathode plates 6 are individually transferred by means of a first transfer means generally designated by the reference numeral 21 and which conveys them the plate 6 further parallel to their flat sides through the washing apparatus 16 up to a second transfer means generally designated by the reference numeral 18 for transfer to a stacking station generally designated by the reference numeral 20.

The second chain conveyor 14 includes only one chain strand provided at its outer periphery with support members 22 (FIG. 3) which comprise at their top a wide outwardly widening groove 24 into which the cathode plates 6 are placed with their lower edge. At every other support member 22 the groove 24 is provided at its rear end, viewed in the conveying direction, with a transverse wall 26 which ensures the entraining of the cathode plate 6 standing in the groove 24. The transfer of the cathode plates 6 from the first conveyor chain 4 to the second chain conveyor 14 takes place at the return point 21 of the first chain conveyor 4 which on passage of its chains onto the lower run individually releases the bars 10 with the cathode plates 6. The cathode plates 6 first remain standing on the support members 22 of the second chain conveyor 14, being inclined by about 5° in the direction of the previous conveying movement on adjustable rails or rollers 27, 28 as shown in detail in FIG. 3. To remove the bars 10 from the loops 8, a push rod 52, displaceable by a hydraulic cylinder 50, is provided and engages the end face of the bars 10 facing the washing apparatus 16 and displaces the bars 10 until their other end comes into the action range of conveyor rollers 54 which withdraw the bars 10 completely from the loops 8.

Figure 4:
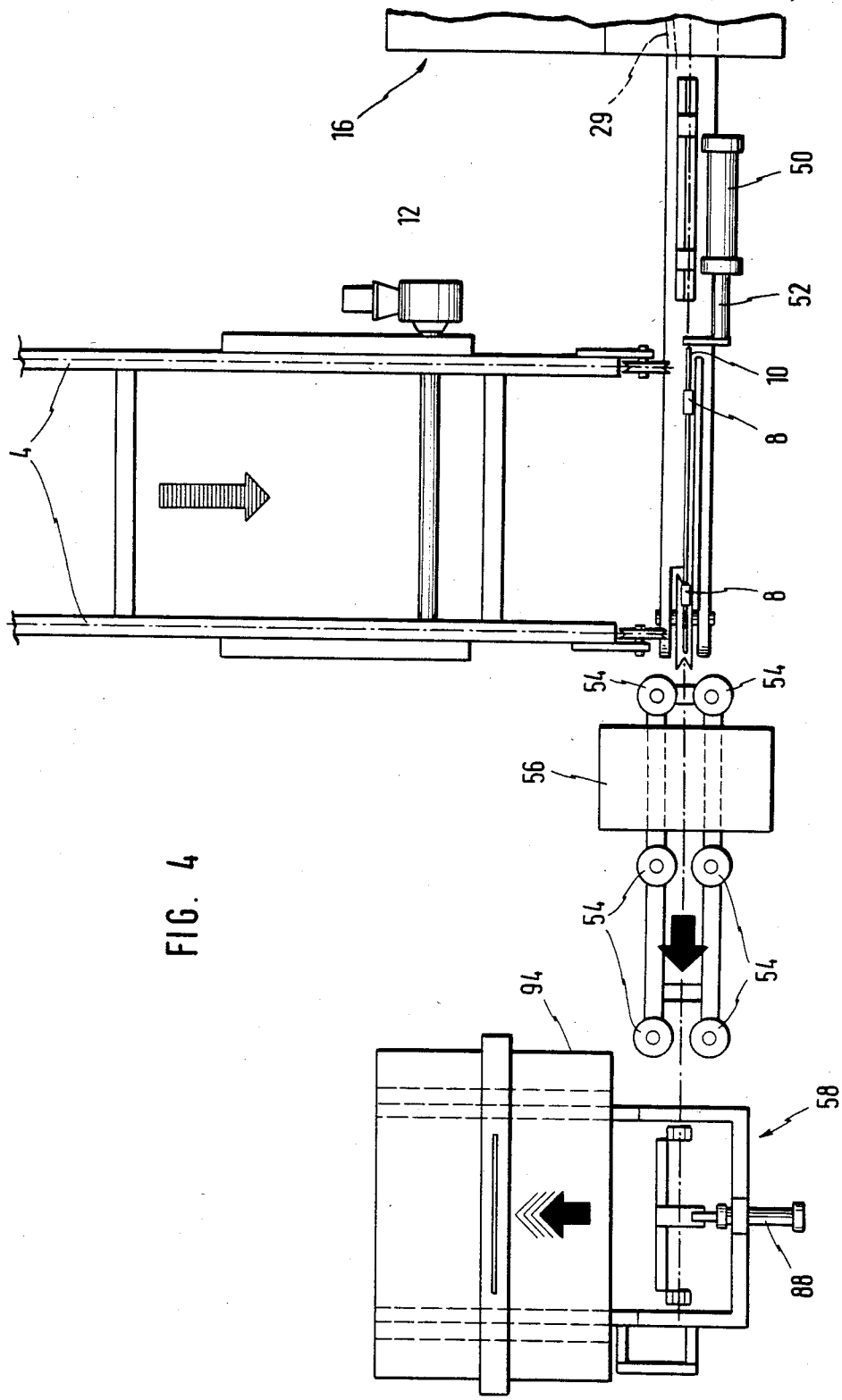
FIG. 4 is part of the plan view of FIG. 1 to a larger scale.

The bars 10 pass through a washing means 56 (FIG. 4) in which they are cleaned from adhering contaminants. Thereafter, the bars 10 are stacked by a stacking means 58 in a magazine 94. To bring bars 10 which have a rectangular, oval or drop-shaped cross-section into the flat position necessary for their later use, the stacking means 58 is constructed as hydraulically operated turning means. It comprises, as shown in FIGS. 5 and 6, two double-armed levers 60 which are mounted non-rotatably on a shaft 62. The shaft 62 is rotatably mounted at its ends in each case in a first slide member 64 which are each displaceable on a guide rail 66 up to a second slide member 68 which bears, via a spring 70, on the frame 72 of the apparatus. The double-armed levers 60 are provided at their one arm 74 with a claw 76 which is adapted to the profile of the bars 10 and into which the latter are pushed after withdrawal from the cathode plate 6. The second arm 78 of the double-armed lever 60 is connected via a link 80 to an arm 82 which is secured via a horizontal intermediate member 83 to the second slide member 68. A crank arm 84 is non-rotatably mounted in the center on the shaft 62 carrying the double-armed levers 60 and is engaged by the piston rod 86 of a hydraulic cylinder 88 which is pivotably mounted in the frame 72 of the apparatus about an axis 90.

In the retracted end position of the piston rod 86, the claws 76 are in a position in which their opening aligns with the axis of the bars 10 withdrawn from the loops 8 of the cathode plates 6.

On extension of the piston rod 86, the bars 10 received by the claws 76 are turned through 90° and deposited on rails 92 which are provided in a magazine 94 accommodating a large number of bars 10 (FIG. 2).

The magazine 94 is vertically adjustable so that the bars 10 can be pushed onto the rails 92 arranged above each other. After filling, it is carried away so that the bars 10 can be used again and replaced by an empty magazine.

Figure 7:
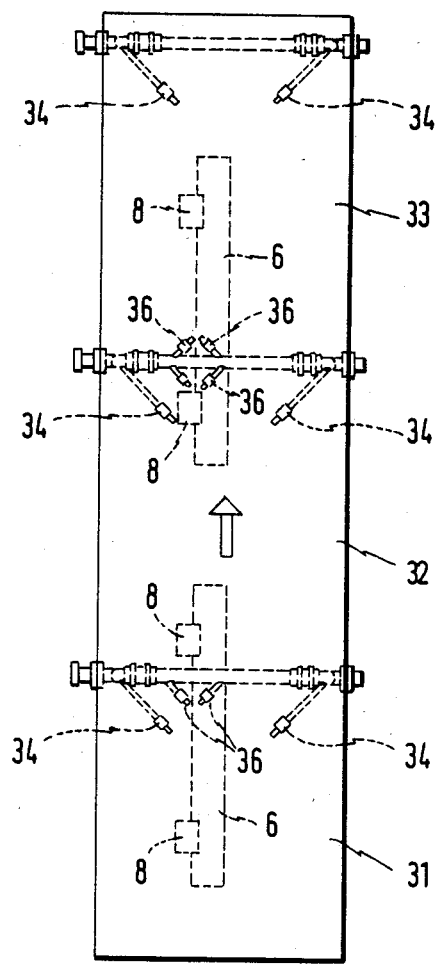
FIGS. 7 and 8 show the plan view and elevation the arrangement of the spray nozzles in the washing chambers.
Figure 8:
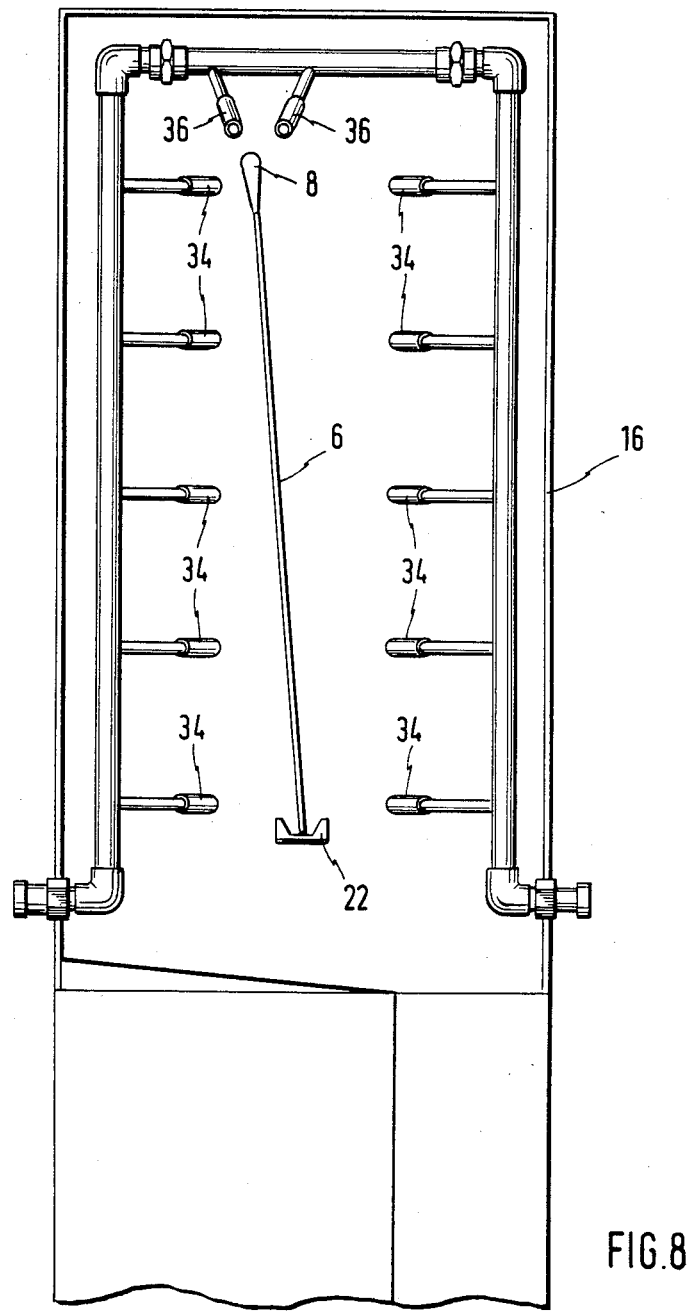

The cathode plates 6, freed from the bars 10, are entrained by the second chain conveyor 14. Before the plates enter the washing chambers of the washing apparatus 16 they are moved by guide rails or rollers 29 into an inclined position of about 5° opposite to the previous position. In this position the plates are led by rails or rollers 30 which hold them in their inclined position through the washing chambers 31, 32, and 33 where they are freed from adhering contaminates by hot water jets which are directed onto the two flat sides of the plates and also into the area of the loops 8. For this purpose, the washing chambers 31–33 are provided at their two longitudinal walls with spray nozzles 34 distributed over the height of the plates 6 (FIGS. 7 and 8). To ensure that the washing liquid also engages the area beneath the loops 8 nozzles 36, directed onto said area, are connected to the washing water line. The washing apparatus is divided into three chambers, the last of which is supplied with pure water, the preceding chambers being supplied from the waste water from the respective following chamber.

After leaving the last washing chamber 33 the cathode plates 6 are further turned by sliding along rollers or rails 38 in the previous inclined position up to an inclination of about 45°. In this position the plates are engaged at their lateral edges or in the region of their upper edge by a gripping means generally designated by the reference numeral 100 and deposited in a stacking station.

The means 100 for gripping and depositing the cleaned cathode plates 6 (FIGS. 9 and 10) comprises a column 106 is pivotably mounted on a base 102 about an axis 104 in the vertical plane perpendicularly to the conveying direction of the second chain conveyor 14 and which is provided at its upper end with a cantilever arm 108. The column 106 is pivoted by a hydraulic cylinder 110 whose piston rod 112 engages a lever arm 114 secured to the lower end of column 106. A U-shaped carrier member 116 is mounted on the cantilever arm 108 pivotably about a vertical axis 118. The carrier member 116 comprises a gripper arm 124 at each leg 120 pivotable about an axis 122. The gripper arms are provided with a rearward extension 126 on which engages the piston rod 127 of one of two hydraulic cylinders 128 mounted in the carrier member 116.

To engage the cathode plates 6 standing in inclined position on the chain conveyor 14 the column 106 with the carrier member 116 is inclined to such an extent that the gripper arms 124 come into the region of the lateral edges of the cathode plates 6.

By actuating the cylinders 128 the plates 6 are engaged by the gripper arms 124. By pivoting back the column 106 with the aid of the hydraulic cylinder 110 into the vertical position the plates 6 are moved over a vertically adjustable table 130 on which they are stacked. From there they are brought with the aid of a conveying means, not shown, to the withdrawal stations. Since the carrier member 116 is mounted pivotably about the vertical axis 118 on the cantilever arm 108, the cathode plates 6 gripped by the gripper arms 124 can be pivoted about said axis 118 and therefore deposited with any desired position of the loops 8. For the drive of this rotational movement a hydraulic drive 132 is disposed on the cantilever arm 108 and pushes to and fro a rack which engages with a pinion keyed on a shaft fixedly connected to the carrier member 116.

Figure 13:
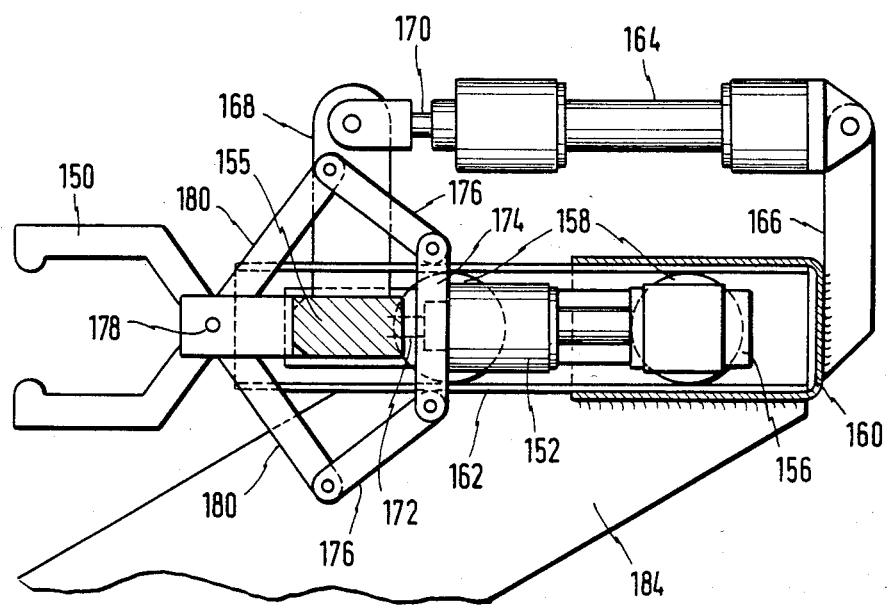
FIG. 13 shows the gripper for the removal and stacking means according to FIGS. 11 and 12.

In a second embodiment (FIGS. 11, 12 and 13) of the means 100 for gripping and depositing the cleaned cathode plates 6 the latter are engaged substantially in the middle of their upper edge by a tongs-like gripper 150 mounted on a cantilever arm 160. Said gripper is opened and closed by a hydraulic cylinder 152.

The gripper 150 and the hydraulic cylinder 152 are disposed on a carriage 154 which is formed by two flat steel bars 156 connected by an intermediate member 155 and four wheels 158 and is displaceable by means of a further hydraulic cylinder 164 in two U-irons 162 mounted on a cantilever arm 160. The hydraulic cylinder 164 is articulatingly connected with its cylinder and piston rod 170 to arms 166 and 168 respectively secured at the top of the cantilever arm 160 and the intermediate member 155.

The piston rod 172 of the hydraulic cylinder 152 actuating the tongs-like gripper 150 is secured to the intermediate member 155 of the carriage 154. When pressure is applied to the cylinder 152 the latter is pushed back on the carriage 154. It thereby pivots, via a driver 174 and two link arms 176, the legs 180 of the gripper 150 rotatable about an axis 178 and closes the gripper 150.

The cantilever arm accommodating the carriage 154 with the gripper 150 is mounted on a column 184 pivotable about a horizontal axis 182 perpendicularly to the conveying direction of the second chain conveyor 14 at an angle such that the displacement direction of the carriage 154 in the one end position A of the column 184 lies in the plane of the cathode plate 6 to the gripped and in the other end position B is directed horizontally. In this position the cathode plate is deposited on the lifting table 130. For pivoting the column 184, the fulcrum 182 of which is disposed on a base 186, a hydraulic cylinder 188 is provided whose piston rod 190 engages an arm 192 secured to the column. On pivoting of the column out of its position A, in which the cathode plates 6 are gripped by the gripper 150, into the position B in which the plates move into a horizontal attitude, the plates 6 are pulled over a curved guide surface 193 which is provided with one or more rollers 195 to reduce friction.

The drives 12 and 15 of the two chain conveyors 4 and 14 and the actuation of the push rod 52 and the stacking means 20 and 58 are time controlled by control means, not shown 6 in such a manner that smooth operation of the entire apparatus is ensured.

In a modified embodiment in which the cathode plates 6 are led in pairs adjacent to each other through the washing apparatus, in each case two fo the cathode plates 6 arriving at the transfer means on the first chain conveyor 4 can be placed on the second chain conveyor 14 in such a manner that they are conveyed adjacent to each other through the washing apparatus 16.

The cathode plates 6 are inclined in V-shaped manner with respect to each other with upwardly widening intermediate space on the second chain conveyor 14 so that the spraying nozzles can be directed both at the faces of the cathode plates 6 facing towards each other and at the outer faces. After the washing apparatus the cathode plates 6 arriving in pairs are brought in close engagement with each other and then simultaneously gripped by the stacking means.

Figure 14:
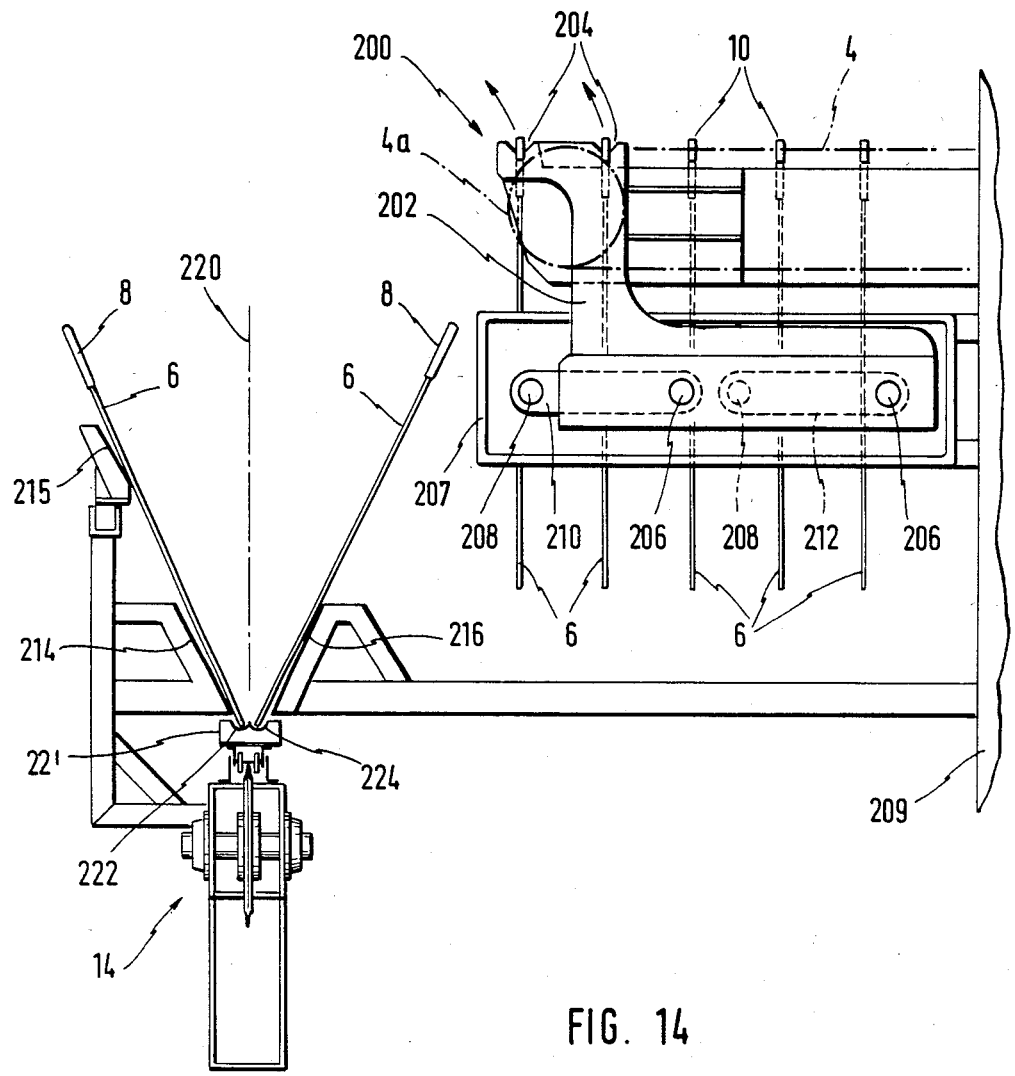
FIG. 14 shows a modified transfer means.

FIG. 14 shows such an apparatus in which the cathode plates 6 are placed in pairs from the chain conveyor 4 onto support members 22' of the chain conveyor 14 leading through the washing apparatus 16. For this purpose a transfer means 200 is provided which is disposed at the end of the chain conveyor 4 substantially in the region of the return roller 4a thereof and comprises on each side of said conveyor an upwardly directed arm 202 which is provided at its upper end at the interval of the cathode plates suspended on the chain conveyor 4 with depressions 204. At their lower end the arms 202 are each mounted on two crank pins 206 which are carried by crank arms 210 and 212 which are mounted on two synchronously rotating shafts 208 mounted on support arms 207. The support arms 207 are welded to the machine frame 209. As soon as two cathode plates have reached the reversal roller 4a of the chain conveyor 4, on rotation of the shafts 208 by means of a drive which is not illustrated they are gripped by the upper end of the arms 202 in the depressions 204 and raised so that they come clear of the chain conveyor 4. On further rotation of the shafts 208 the cathode plates are placed on the support members 22' of the chain conveyor 14. They are guided by guides 214, 215 and 216 in such a manner that they stand inclined with respect to each other in V-manner on the support members. The bars 10 are then removed from the loops 8 of the cathode plates 6 by ejection means similar to the means 50, 52 and the cathode plates 6 conveyed through the washing apparatus 16 in pairs. In the present case the support members 22' preferably have two grooves 222 and 224 which are disposed symmetrically with respect to the center line 220 to provide a certain spacing for the cathode plates 6 in the chain lower region as well.

It is also possible to construct the transfer means 200 so that it lifts the cathode plates in threes from the chain conveyor 4 and places them in fan manner on the support members of the chain conveyor 14. In this case the arms 202 are provided with three depressions 204 arranged at the intervals of the cathode plates apart in order to raise three cathode plates from the conveyor 4 in each case. The transfer means 200 are preferably so designed that the middle one of the three cathode plates is lowered substantially in the region of the center line 220. The middle plate is held by suitable guide means in a substantially vertical position. The guide means for the middle plate extend preferably from the end side of the conveyor 14 above the support member 22' to the right and left of the center line 220 substantially at the same level as the guide 216 into the transfer region. In the following washing apparatus 16 corresponding guides can be provided for the three cathode plates above chain conveyor 14.

On transferring in each case three cathode plates it is convenient to provide the support members 22' of the chain conveyor 14 with three grooves to maintain the lower ends of the three plates a predetermined distance apart from each other.

It is also possible to construct the transfer means and the guide means so that in each case more than three cathode plates are placed in fan manner on the support members of the chain conveyor 14.

If on the chain conveyor 14 in each case two or three or more cathode plates 6 are placed inclined substantially in V-manner or in substantially fan manner with respect to each other, the washing means 16 comprises additional nozzles extending from above between the two, three or more cathode plates 6 and spraying on their faces facing toward each other, and in this case behind the washing means guide means are provided which bring the two, three or more cathode plates 6 into substantially close engagement with each other, so that they can be jointly gripped by grippers 116 adapted to grip more than one plate for depositing on the table 130.

Figure 3:
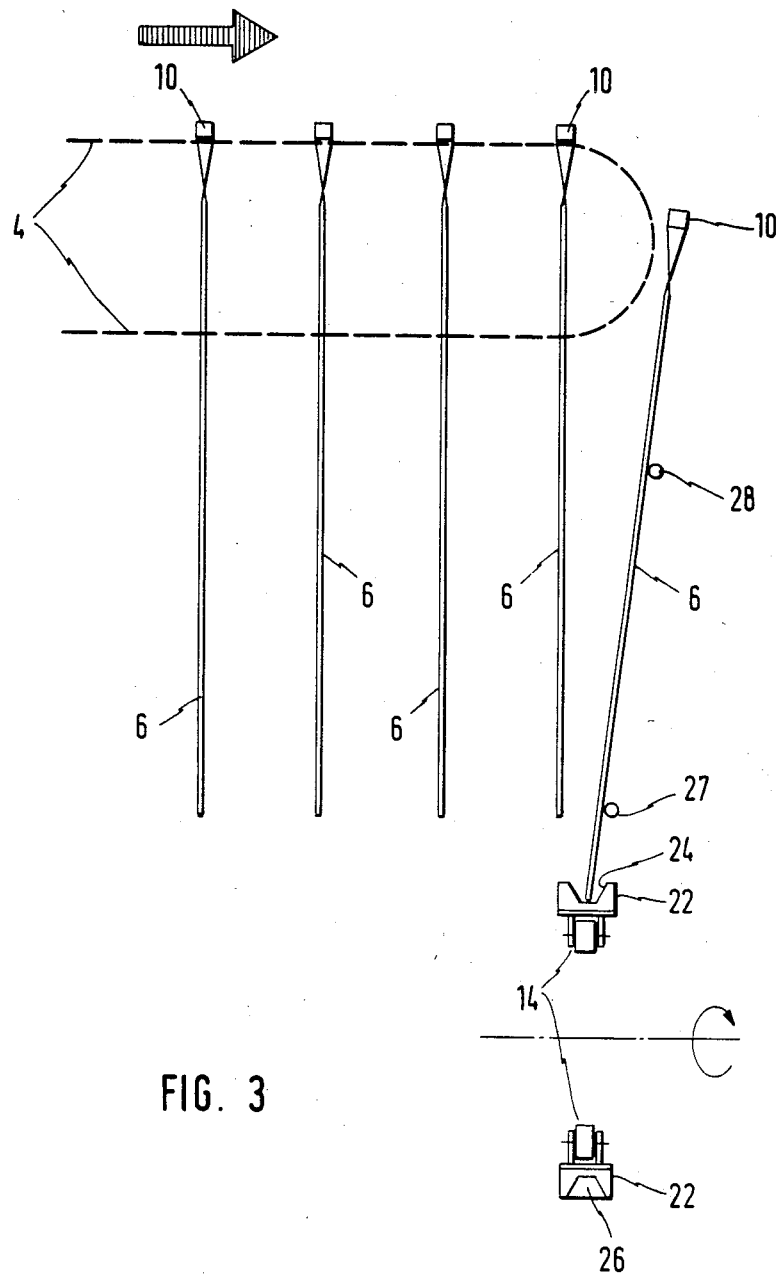
FIG. 3 shows the transfer of the cathode plates from the first to the second chain conveyor.

Instead of the transfer means according to FIG. 3 the transfer means of FIG. 14 may be used for the transfer of one cathode plate in each case, if the arms 202 are designed accordingly and provided with only one depression 204 each.

The washing of the cathode plates has been explained in the aforementioned description of the drawings. In a similar way anode plates 6 can also be washed, in which case no bars which have to be removed are present and therefore the removal of bars dispensed with. In the case of scrap anodes which have an irregular lower edge it is however advantageous to use a gripper device instead of the transfer means or in combination therewith which gripper device engages the anode plates in the region of their lateral edges especially in the region of the lateral edges of their lugs similarly to the gripper device of FIGS. 9 and 10, and lifts the first anode plate from the chain conveyor 4 or from the arm 202 of the transfer means 200 when the arms 202 are in their highest position, and turns the anode plate in such a way that it is placed upside down at its top side on the support members of the chain conveyor 14. It is also possible to construct the gripper device so that it places in each case two or more anode plates simultaneously or one after another on the support member 22' of the chain conveyor 14 in substantially V-manner or in substantially fan manner with respect to each other.

In the drawings and specification, there have been set forth preferred embodiments of the invention, and although specific terms are employed, they are used in a generic and descriptive sense only and not for purposes of limitation.

We claim:

1. A method for cleaning cathode and/or anode plates obtained in an electrolytic refining of metals, the cathode plates being originally deposited on thin starting sheets consisting essentially of the same metal being refined and including loops for accommodating cathode bars to enable a suspension of the cathode plates in an electrolytic bath, the anode plates including suspension lugs, the method comprising the steps of:
  lifting the cathode plates or anode plates from the electrolytic bath by the cathode bars or lugs in groups of plates;
  transferring the cathode plates or anode plates from the electrolytic bath to a washing unit including supporting the cathode or anode plates at a lower edge thereof;
  removing the cathode bars from the cathode plates prior to an entry of the cathode plates into the washing unit;
  successively passing at least one of the cathode plates or at least one of the anode plates through the washing unit in a direction extending substantially parallel to flat sides of the plates; and
  subjecting the cathode plate or anode plate to a washing operation in the washing unit by spraying the flat sides of the plates with wash liquid sprayed through nozzle means which execute a relative movement along the flat sides of the plates.

2. Method according to claim 1, characterized in that the anode plates are scrap anodes supported upside down.

3. A method according to claim 1, characterized in that the subjecting of the plates to a washing operation includes subjecting the plates to a multistage washing operation in succession.

4. A method according to claim 1, characterized in that the removal of the cathode bars is effected by either ejection or withdrawal thereof from the loops of the cathode plates.

5. A method according to claim 1, characterized in that for removal of the cathode bars the loops are either cut or severed from the cathode plates.

6. A method according to claim 1, characterized in that the cathode bars are subjected to a washing operation after removal from the cathode plates.

7. A method according to claim 6, characterized in that the bars are stacked in a magazine after the washing operation.

8. A method according to claim 7, characterized in that when using bars with a cross-sectional profile increasing the carrying capacity and having greater dimensions vertically than horizontally, the bars are deposited in the magazine with predetermined orientation of their cross-sectional profile.

9. A method according to claim 1, wherein during the transferring of the cathode plates and anode plates, the lower edges thereof are supported such that the cathode or anode plates are disposed at a predetermined inclination.

10. A method according to claim 1, wherein the step of successively passing includes passing at least a pair of cathode plates or anode plates through the washing unit with the plates being inclined with respect to each other in a substantially V-shaped configuration.

11. A method according to claim 1, wherein the step of successively passing includes passing at least three plates through the washing unit with the plates being inclined away from each other in the manner of a fan.

12. A method according to claim 1, wherein the thin starting sheets have a thickness of 0.8 mm, and the metal being refined is copper.

* * * * *